(12) United States Patent
Nagpal et al.

(10) Patent No.: US 9,544,398 B2
(45) Date of Patent: Jan. 10, 2017

(54) SYSTEM AND METHODS TO STORE, RETRIEVE, MANAGE, AUGMENT AND MONITOR APPLICATIONS ON APPLIANCES

(71) Applicant: Good Technology Holdings Limited, Waterloo (CA)

(72) Inventors: Aashin Nagpal, Cupertino, CA (US); Ken C. Singer, Brisbane, CA (US); Holger Assenmacher, Eulenbis (DE)

(73) Assignee: Good Technology Holdings Limited, Waterloo, Ontario (CA)

( * ) Notice: Subject to any disclaimer, the term of this patent is extended or adjusted under 35 U.S.C. 154(b) by 0 days.

(21) Appl. No.: 14/872,647

(22) Filed: Oct. 1, 2015

(65) Prior Publication Data
US 2016/0028853 A1 Jan. 28, 2016

Related U.S. Application Data

(63) Continuation of application No. 12/876,214, filed on Sep. 6, 2010, now Pat. No. 9,185,554.
(Continued)

(51) Int. Cl.
*G06F 15/16* (2006.01)
*H04L 29/08* (2006.01)
(Continued)

(52) U.S. Cl.
CPC .............. *H04L 67/34* (2013.01); *H04W 8/245* (2013.01); *H04W 12/06* (2013.01)

(58) Field of Classification Search
USPC .................................................. 709/203, 217
See application file for complete search history.

(56) References Cited

U.S. PATENT DOCUMENTS

| 6,021,438 A | 2/2000 | Duvvoori |
| 7,072,913 B2 | 7/2006 | Jans et al. |

(Continued)

FOREIGN PATENT DOCUMENTS

| EP | 1376930 A2 | 1/2004 |
| KR | 10-2008-0006881 A | 1/2008 |

OTHER PUBLICATIONS

Sophos "Zippo Trojan horse demands $300 ransom for victims' encrypted data" Mar. 15, 2006 pp. 1-2.
(Continued)

*Primary Examiner* — Jude Jean Gilles
(74) *Attorney, Agent, or Firm* — Fish & Richardson P.C.

(57) ABSTRACT

Systems and methods for managing applications on an appliance are provided. A server is in communication with appliances. The server is also coupled to databases which include appliance information, as well as application data. A user may authenticate using the appliance. A set of permissions may be associated with the user. The server then supervises information exchanged between the appliance and the server, as well as application functionality upon the appliance, by supplementing the applications downloaded to the appliance with supplemental code, referred to hereafter as an AppGuard. The AppGuard is tailored, using information related to the appliance, to the appliance type in order to ensure proper functionality. The AppGuard is executed upon installation, and collects device information for validation. After validation, the application may be run. Additionally, management of the applications may include augmenting, deleting, disabling or authorizing the application.

18 Claims, 11 Drawing Sheets

Related U.S. Application Data

(60) Provisional application No. 61/276,129, filed on Sep. 8, 2009.

(51) Int. Cl.
*H04W 12/06* (2009.01)
*H04W 8/24* (2009.01)

(56) References Cited

U.S. PATENT DOCUMENTS

| | | |
|---|---|---|
| 7,089,259 B1 | 8/2006 | Kouznetsov et al. |
| 8,224,750 B1 | 7/2012 | Bennett et al. |
| 2002/0107809 A1 | 8/2002 | Biddle et al. |
| 2005/0267895 A1* | 12/2005 | Yoshiuchi ......... H04L 29/06027 |
| 2006/0073820 A1 | 4/2006 | Craswell et al. |
| 2006/0277590 A1 | 12/2006 | Limont |
| 2007/0004393 A1 | 1/2007 | Forsberg et al. |
| 2007/0271162 A1 | 11/2007 | Shuster |
| 2008/0134347 A1 | 6/2008 | Goyal et al. |
| 2008/0201453 A1 | 8/2008 | Assenmacher |
| 2010/0057834 A1* | 3/2010 | Macken ................. G06F 9/543 709/203 |
| 2010/0057937 A1* | 3/2010 | Macken ................. G06F 9/541 709/246 |
| 2010/0192124 A1 | 7/2010 | Hall et al. |
| 2011/0082900 A1* | 4/2011 | Nagpal ................. H04W 8/245 709/203 |
| 2011/0153697 A1* | 6/2011 | Nickolov .............. G06F 9/4856 707/827 |
| 2013/0117089 A1 | 5/2013 | Pachikov et al. |

OTHER PUBLICATIONS

Seybold, Patrick. "PS3 Firmware (V3.21) Update". Mar. 28, 2010. p. 1.

ISA/KR, PCT International Search Report and Written Opinion dated Jun. 3, 2011 issued on related Intl. Application No. PCT/US2010/047956 filed Sep. 7, 2010, 8 pages.

Extended European Search Report issued in European Application No. 10819226.1 on Oct. 18, 2016.

* cited by examiner

SYSTEM AND METHODS TO STORE, RETRIEVE, MANAGE, AUGMENT AND MONITOR APPLICATIONS ON APPLIANCES

CROSS-REFERENCE TO RELATED APPLICATIONS

This application is a continuation under 35 U.S.C. §120 of U.S. patent application Ser. No. 12/876,214, filed Sep. 6, 2010, which claims the benefit of U.S. Provisional Patent Application No. 61/276,129, filed Sep. 8, 2009, and entitled "Method and System to Store, Retrieve, Manage, Functionally Augment and Monitor Applications for Mobile Devices." The entire contents of each of these applications are hereby incorporated in full by reference.

Further, the entire contents of U.S. patent application Ser. No. 12/032,093, filed Feb. 15, 2008, and entitled "Methods and System to Create Applications and Distribute Applications to a Remote Device" are hereby incorporated by reference.

BACKGROUND OF THE INVENTION

The present invention relates to the management of applications on an appliance. More specifically the invention relates to controlling the use of applications on appliances such as mobile devices according to permissions set on an external server system. The appliance, in some embodiments, may be subservient to the server.

The rapid growth in the availability and deployment of mobile appliances has facilitated remote working. From ultra-portable laptop computers to smart-phones, there is a need for portability of the conventional workplace for office workers and workers who must travel. Currently, there are two ways that a mobile appliance may be enabled for remote working. In the first case, applications are run remotely and the user enjoys the use of the application through a connected session. This usually involves a browser, or some application-specific equivalent, that offers the user the same user interaction and experience, within the limitations of the device, as are normally achieved when connected in an office environment at a desktop computer. A session based solution suffers from the inconvenience and technical challenge that a connection must be secured and the appliance remains connected throughout the session. In a truly mobile environment, the data connection is often difficult because of network limitations and uncertain signal quality.

The second way a mobile appliance may be enabled for remote working is for the application in use to be physically resident and enabled on the appliance (i.e., stored locally on the appliance). This solution has a strong advantage in that it permits a user to work with the application locally without the need for a sustained connection. To implement this second solution requires that the applications be downloaded to the appliance and then enabled. Applications for mobile devices may already be stored and retrieved from application repositories and delivered to mobile appliances using a wireless network. Such examples can be found with Apple's AppStore for the iPhone and the RIM Blackberry family of products.

There are significant drawbacks to locally stored applications on an appliance. For example, it has a serious disadvantage in that stored local information is not secure, and corporate intellectual property, or other sensitive information, may be compromised by its exposure. Access to sensitive information is not easily controlled, and the risks of theft damaging a company are very high.

Hence there is a need for a system to manage applications on an appliance without requiring constant connectivity, and further without compromising security of the application and/or confidential information. Such a system may manage applications by individually approving them for execution, functionally augmenting them by adding validity checking and user confirmation, and monitoring them for permitted networks and connection targets. In some embodiments, applications may be restricted from access to locally stored persistent data or the data may itself be removed.

In view of the foregoing, systems and methods for managing applications on an appliance are disclosed. The present invention provides a novel system for securely regulating information exchange on an appliance, without requiring a constant connection between the appliance and an external server.

SUMMARY

The present invention discloses a system and method for managing applications on an appliance. More particularly, the present invention teaches systems and methods for securely regulating information exchanges on an appliance without requiring a persistent connection to company resources.

In some embodiments, a server is in communication with one or more appliances. The appliances are typically mobile devices, such as cellular phones; however, any suitable electronic device is considered within the scope of the invention. The server is coupled to one or more databases which include device information as well as an application database.

A user may authenticate using the appliance. A set of permissions may be associated with the user. The server then supervises information exchanged between the appliance and the server, as well as application functionality on the appliance. The server may likewise be enabled to record transactions of any information exchange with the appliance. Generally, the appliance is subservient to the server.

Control over application functionality and information exchange may be accomplished, in some embodiments, by supplementing the applications downloaded to the appliance with supplemental code, referred to hereafter as an AppGuard. The AppGuard is tailored, using information related to the appliance, to the appliance type in order to ensure proper functionality.

In some embodiments, the user searches for applications using a web based platform. An arbitrary keyword matching system may be utilized to find applications of interest. Only applications that the user has authority to use are generally presented to the user. The user may then download the application from the server to the appliance. In some embodiment, the server first adds the supplemental AppGuard to ensure management of the application. In some alternate embodiments a developer may directly add the supplemental AppGuard to the application prior to uploading to the server. Once downloaded, the AppGuard is executed upon installation. The AppGuard may collect device information. The AppGuard may require validation from the server prior to installation. Validation of permissions may utilize the collected data. After validation, the application may be run.

Additionally, further functionalities may be included within the application using the AppGuard. For example, if the appliance is lost, the user may be able to notify the server that the appliance has been misplaced. The AppGuard may then disable the application in order to limit release of any sensitive information. Likewise, the server may be enabled to collect information regarding the appliance's environment and base management decisions upon environmental indicators. An example of this includes where the appliance determines if it is in the presence of certain devices, such as a particular Bluetooth headset.

Management of the applications may include augmenting, deleting, disabling or authorizing the application. Augmentation, for the purposes of this application, includes any functional modification to the application. In addition to application management, the server may also, in some embodiments, be enabled to disable the appliance itself. For example, if permission validation fails, the AppGuard may prevent the usage of an application, or may even purge the persistent memory of the application.

Note that the various features of the embodiments described above may be practiced alone or in combination. These and other features of embodiments of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

In the drawings, like reference numerals are sometimes used to designate like structural elements. It should also be appreciated that the depictions in the figures are diagrammatic and not to scale.

DETAILED DESCRIPTION OF CERTAIN INVENTIVE EMBODIMENTS

I. System Framework

Figure 1:
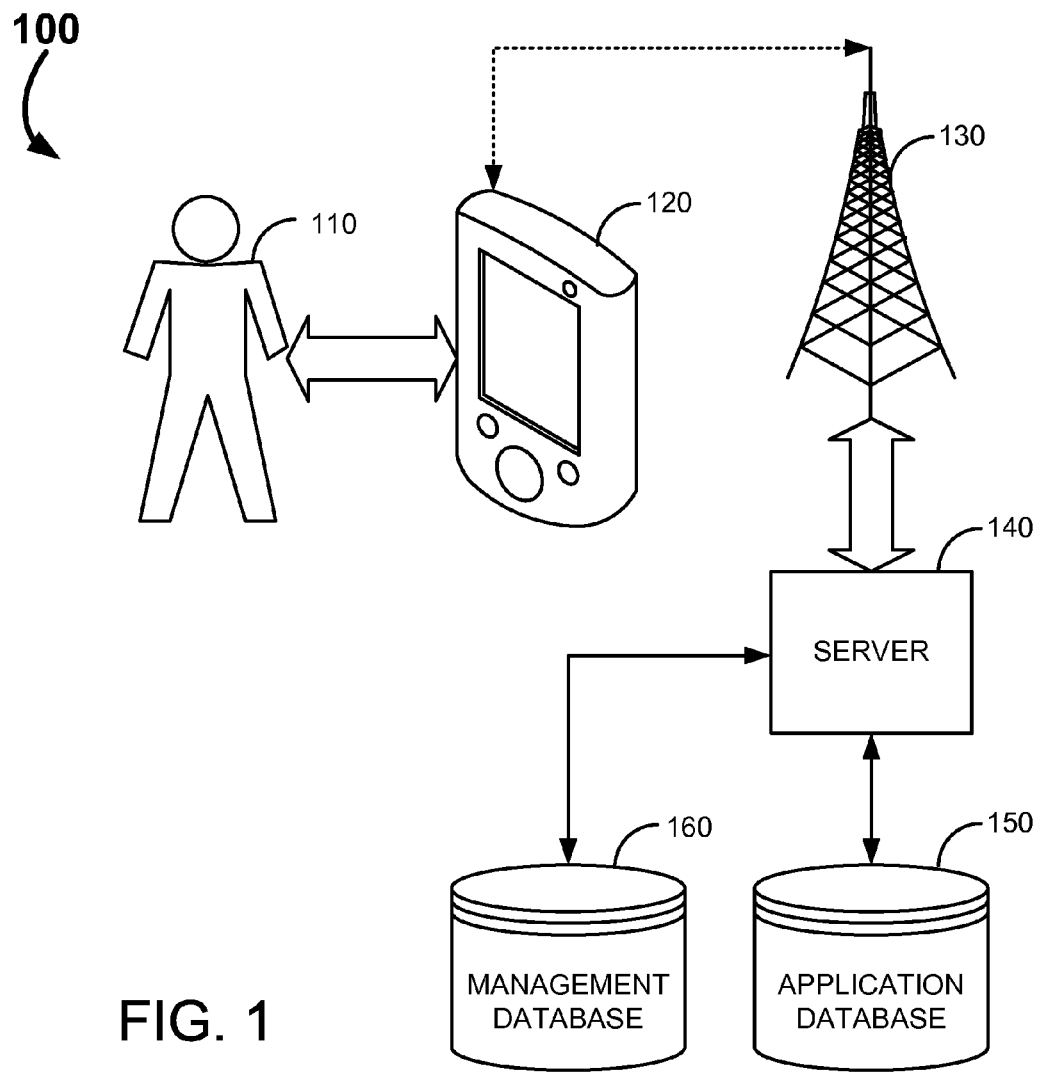
FIG. 1 is an example diagram of the application management system in accordance with an embodiment of the present invention.

To facilitate discussion, FIG. 1 is an example illustration 100 of the application management system in accordance with some embodiments. Here a User 110 is seen interacting with an Appliance 120. Here the Appliance 120 is illustrated as being a smart cell phone type device, such as a Blackberry. However, as previously noted, any type of electronic appliance capable of supporting an application may be utilized with the application management system.

The Appliance 120 may be in periodic wireless connectivity with a Cellular Tower 130. Likewise, in some embodiments, the Appliance 120 may instead be configured to have connectivity through a WiFi base station, satellite connection, or even wired connection such as through a modem.

The Cellular Tower 130 may be coupled to a back end Server 140. The Server 140, in some embodiments, may be an independent third party system accessible by developers, IT professionals and end users via a web based portal or other host platform. The Server 140 may require authentication prior to access. In some alternate embodiments, the Server 140 may be an internal corporate server, only accessible by authorized corporate personnel.

The Server 140 may have access to a number of databases. These may include an Application Database 150 and one or more Management Databases 160. The Application Database 150 may include source code for any number of applications. These applications may include commercially available applications, such as Microsoft Office products, or may be internally developed, or modified, applications. The Management Databases 160, in comparison, may include information on particular devices, user information, and corporate access permissions.

As previously noted, existing application storage marketplaces exist. In these marketplaces completed applications are developed externally and stored prior to distribution. The iPhone AppStore is a clear example of externally developed applications marketplace. In some embodiments, the Server 140 may function in a similar fashion. In such embodiments, the applications may be externally developed and subsequently uploaded to via the Server 140 to the Application Database 150. Permissions may then be configured within Management Databases 160.

Additionally, in alternate systems, applications may be designed in and updated from a web browser based environment. U.S. patent application Ser. No. 12/032,093, published as U.S. 2008/0201453, which is incorporated by reference, is an example of such a web based development platform. In some embodiments, the Server 140 may be accessed by a developer via a web based browser in such a manner for the development of applications. These applications may then be managed, functionally augmented, and monitored by the application management system described herein.

In some embodiments, applications which have been created and modified in the aforesaid web browser based design environment (for example, Ondeego's Cell Author product) may be changed and these changes to an existing application may then be automatically propagated to devices on which they have been already installed. In the case of an application server whose stored applications comprise more than one "CellAuthor" or externally sourced application, one or more related programs may be automatically included. When more than one application is available, the related programs may comprise programs that allow selection of one or more applications and, further, programs that permit related applications to share common data. This latter feature eliminates wasteful duplication of information which is a significant deficiency of separate, stand-alone applications.

Applications generally comprise one or more machine or computer instructions for causing an appliance to perform certain actions. These applications may be distributed in an application marketplace using an application Server 140 which may have stored one or more applications as discussed above.

Applications may be uploaded to the Server 140 by authenticated providers (i.e., developers). Authentication may be achieved by any of a number of methods well known in the art. For example a simple challenge-response method may require a user to enter a valid password prior to the connection permission being set to allow such upload actions.

II. Application Management

Figure 2A:
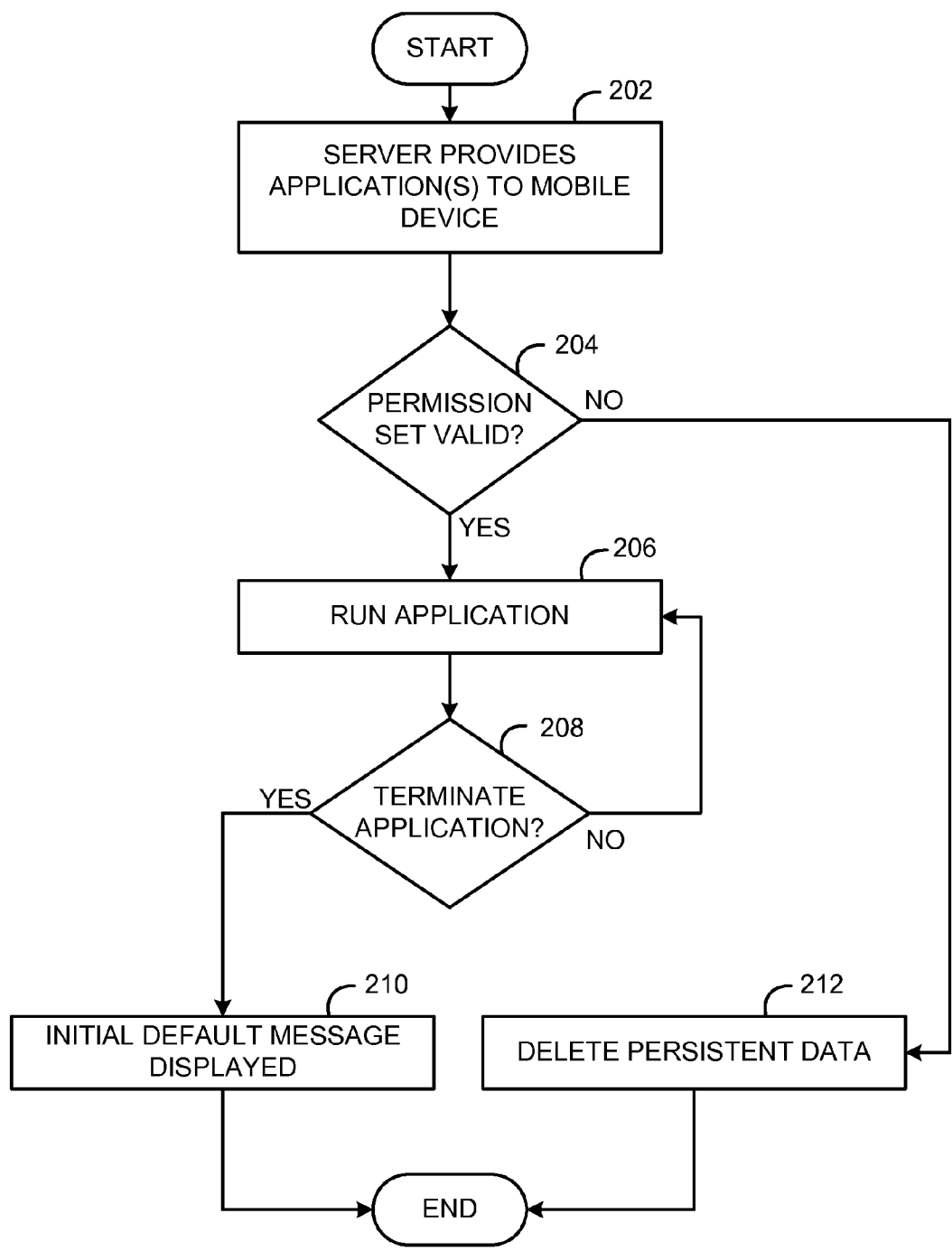
FIG. 2A is an example flowchart for the management of applications within an appliance in accordance with an embodiment of the present invention.

FIG. 2A provides an example flow chart of the process for the distribution and management of applications. In this example process, the Server 140 provides one or more applications to the Appliance 120 at step 202. A check for permission to access the application is performed at step 204. An invalid permission may result in the deletion of persistent data within the Appliance 120, at step 212. In such a manner, sensitive or confidential information may remain secure in the situation where the Appliance 120 is stolen or in the possession of a User 110 without permission to access the particular application/information.

On the other hand, a valid permission enables the User 110 to access/run the application at step 206. This continues until, at step 208, the application is terminated. After termination of the application, an initial default message may be displayed, at step 210. This default message may include the dashboard for the Appliance 120, a web browser page, advertisement, personalized message or similar display.

Figure 2B:
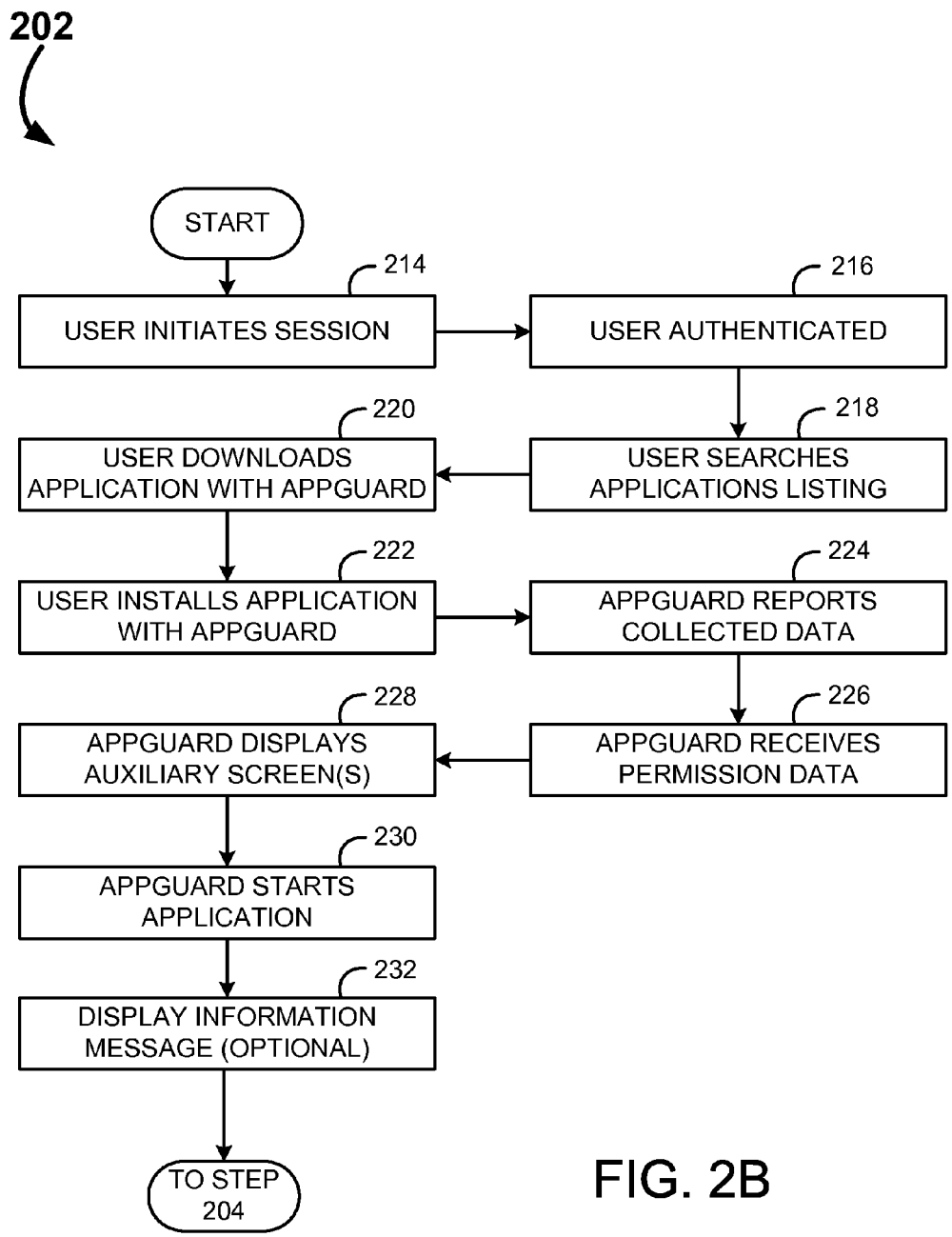
FIG. 2B is an example flowchart for providing an application to the appliance in accordance with an embodiment of the present invention.

FIG. 2B provides an example of a more detailed process flow for providing the application(s) from the Server 140 to the Appliance 120, as indicated at step 202. In this process, the User 110 initiates a session, at step 214. A session may include access through a web browser portal, or access through a secure program interface.

The user may typically be authenticated in the same manner that the developer required authentication, at step 216. Note, however, that while authentication is being discussed at this point in the process, it is equally possible that authentication may be performed at a later time. For example, in some embodiments, the application may be installed prior to authentication without any ill effect. Typically a corporation may provide an authentication key to its employees; single users may have a private arrangement for downloading and use of an application.

Various users may, in some embodiments, have different levels of accessibility, as indicated by profile permissions stored within the Management Databases 160. For example, End Users 110 may only have the ability to download particular applications based upon rank and division within a company. For example, a sales professional within Corporation A may be restricted to general clerical applications and proprietary negotiation applications exclusive to Company A. In contrast, high level engineers within the same company may have access to a whitepaper viewer pertaining to detailed technical documents about the products of the company.

Developer users may have additional permissions including the ability to upload/generate applications. Likewise, high level developers may further have the ability to access existing applications and further modify them to meet particular purposes.

IT management users may have permissions relating to setting the permissions of other users. For example, an IT manager may be empowered to select which end users are capable of downloading particular applications.

After the end User 110 authenticates, the process may continue to step 218 where the User 110 may search for an application. To facilitate this, the server may provide a search utility that allows a user to locate the application desired by one or more of a number of attributes. For example an application may be located by name or, for a corporate user, by searching the name or identification code of the corporation. Search results may be presented as a list of available applications for download. An application may then be selected and downloaded at step 220. When an application is prepared for downloading, the server may first acquire information about the mobile client to which the application is destined. This may be in any of a number of ways known in the art. For example, the authorizing corporation may have set a flag indicating which type of appliance the target is, such as an iPhone or a Symbian OS based product.

As will be discussed in more detail below, once the information regarding the appliance is known, the application may be downloaded with a security component or wrapper, known as AppGuard, affixed to the application. AppGuard may supplement the application in order to ensure future management of the application once locally installed on the Appliance 120. AppGuard may contain information needed by the target device to install the application. AppGuard may simply be a program, or series of instructions, that allow the application to operate successfully in the target appliance. In some embodiments, an AppGuard normally comprises source code that has been compiled into executable code matching the requirements of the target device. Target device platforms include, but are not limited to, J2ME, Windows Mobile, Android, iPhone, and LiMo. To add an AppGuard to an application, for instance in the case of J2ME, the AppGuard classes maybe added to the jar (Java ARchive) tile, the midlet entry point in the manifest changed to point to the wrapper itself, which, when executed, performs initialization and check actions, and then continues to execute the original application midlet. A midlet is a Java application framework for a Mobile Information Device profile, and midlets are normally applications themselves. Signed applications may require a new signature key to be applied by the Server 140. The AppGuard may add actions, for instance, at startup, when the midlet is paused or when the application is terminated.

At step 222, the application with AppGuard is installed upon the Appliance 120. The User 110 may see and respond to information, resulting from the action of the AppGuard, presented at the time of installation of the application. Such information may be delivered in a user friendly fashion to automate the process and minimize the need for expertise on the part of the user 110. Use cases include data gathering, information bulletins, device status control and advice, and other management or supervisory functions. These supplemental programs are often referred to as installation wizards, or launch pads, and may allow some residual functionality to remain after the installation process has completed. This residue may be invoked later when other interactions are required from a user. For example, a failed permission request at a later date may result in the application itself being denied access to local persistent data. The data may have been eliminated from the appliance, may have been locked, or the application itself may have been locked. In order to better manage the failed state of the appliance at that point, the residual function may comprise displaying to the user an interactive alert screen which may take the form of a help screen, a questionnaire or an advertisement inviting the user to consider other offers for services.

The AppGuard may collect and report data regarding the Appliance 120 to the Server 140, at step 224. This collected data may be utilized by the Server 140 to determine if the User 110 may receive permission to access the underlying Application. Thus, at step 226, AppGuard may receive permission data from the Server 140. AppGuard may then display an auxiliary screen or other message, at step 228, and start the application, at step 230. The application may be started as originally designed, or may be started in a modified manner. For example, instead of starting Excel in a blank document, as the original application does, an AppGuard supplemented Excel application may be started by opening the most recent price listings for a given product line for the company that the user is affiliated with.

In another example, opening an HTTP connection may cause it to be rerouted by changing its method name. Every time an HTTP connection is initiated, some server action may be imposed. Its destination may be recorded, or a secure protocol may replace an unencrypted protocol. This may be achieved in one or more ways. The existing application code may be decompiled, new source code added and then the composite code recompiled, in some embodiments. In some cases, new or replacement binary code may be directly injected into the application without the steps of decompilation and recompilation.

In yet another example, the AppGuard may augment online versus offline functionality of the application. For example, the AppGuard may allow the user to access the application some set number of times with a password. When the allowable uses have been exceeded, the application may then be disabled for further use unless the session is online and authenticated. Likewise, the AppGuard may merely restrict some of the data (i.e., particular Excel spreadsheets) in a similar manner.

Additionally, AppGuard may be likewise utilized to enforce user actions, such as installation of updates. For example, if a mandatory update is received, the AppGuard may display a message requiring its installation. If the user does not perform the necessary action, the application may be forced to exit or otherwise be disabled.

Additionally, at step 232, AppGuard may display informative messages, as desired. This may include advertisements, offers for service improvement upgrades, thank-you pages, or customer service outreach.

In addition to the application marketplace, which contains individual applications, user Appliance 120 may also be managed in some embodiments. The Server 140 may be a single server or may have multiple instances or replicas in accordance with methods known in the art. Servers may maintain a record of all transactions within the Management Databases 160. These may include properties of target appliances, applications already accessed by any appliance, appliance approval status and information that allows a device or application lock to be actuated. Users may be authenticated prior to, during or after installation, or any combination of these. Authentication information may be used to qualify a user for one or more roles. For example, a user may be one or more of a device and application User 110, an application approver (i.e., IT manager), or be permitted to upload applications (i.e., developer).

Figure 3:
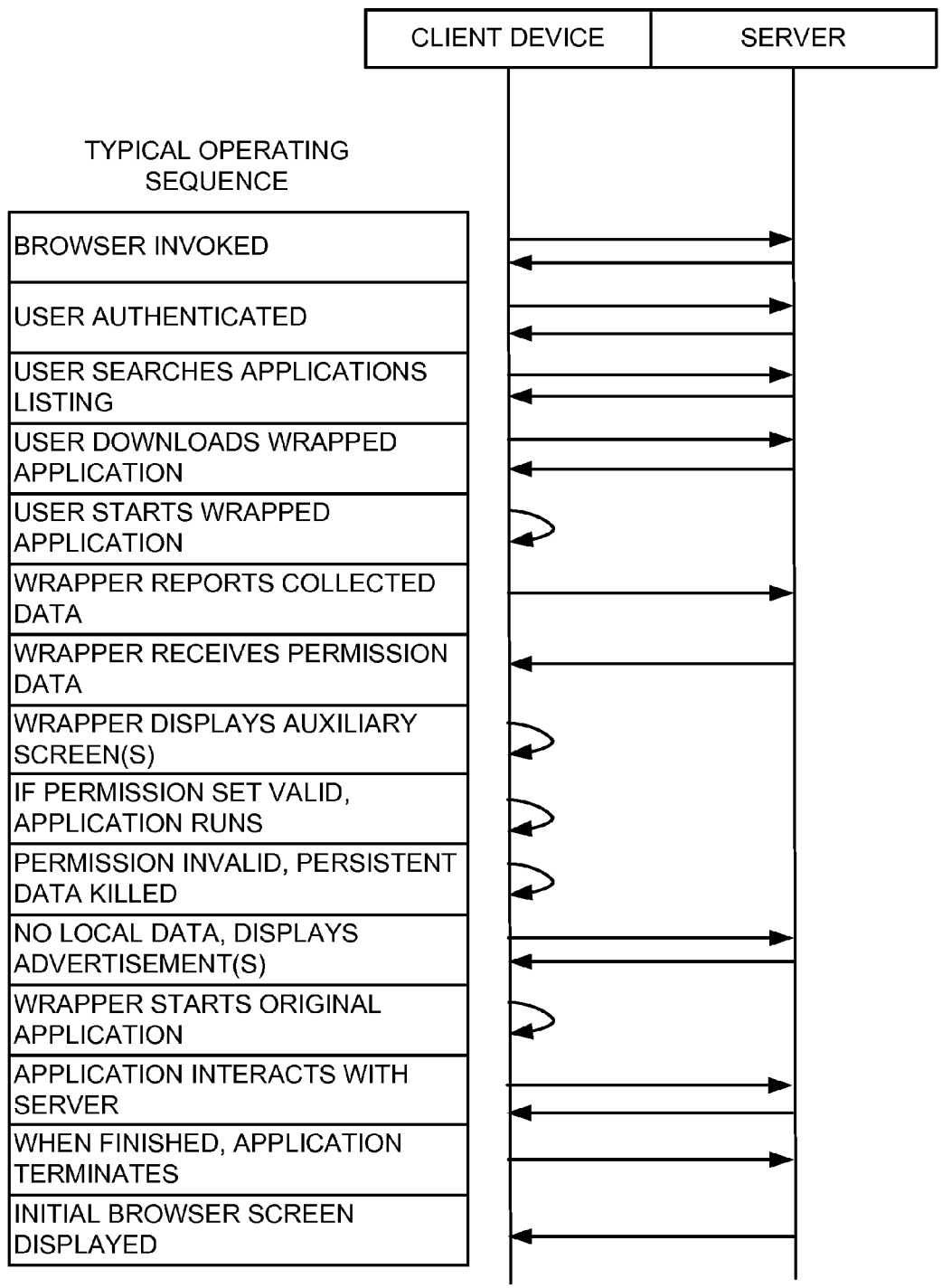
FIG. 3 is an example flow diagram of the transactional steps completed between the appliance and a server in accordance with an embodiment of the present invention.

Proceeding now to FIG. 3, a process flow diagram is provided illustrating the typical operating sequence of some embodiments of the system. Additionally, arrows are illustrated indicating flow of information between the Appliance 120 client device and the Server 140. In this example sequence a browser is first invoked. The Appliance 120 communicates with the Server 140 that a session has been initiated, and the Server 140 may return information including a logon screen or the like. Next the user may be authenticated, as discussed above. Again the Appliance 120 and Server 140 interact to ensure authentication.

The User 110 may search the applications using a browser, search function or the like. Again the Appliance 120 and Server 140 require communication such that only applications that the User 110 has permission to use are displayed as available applications. The application with AppGuard wrapper may then be downloaded to the Appliance 120 from the Server 140.

The User 110 may then start the AppGuard supplemented application. This step is restricted to the Appliance 120 and does not require information from the Server 140. The AppGuard collects information and transmits it back to the Server 140. The Server 140 may then return permission to the Appliance 120.

Next, the AppGuard supplement may display an auxiliary screen, such as an installation wizard. If permission is valid, the application may be run. If permissions are invalid, persistent data may be killed (disabled or deleted). This, functionally, protects information a company considers confidential from access by non-permissible persons. Display of auxiliary screens, running of the application or deletion/disabling of persistent data may be performed on the Appliance 120 without further input from the Server 140.

Next, if no further local data is present, then advertisements or other messages may be displayed on the Appliance 120. Content for these messages may be provided by the Server 140. The AppGuard may then start the application in an original or modified form without any further interaction with the Server 140.

The application running on the Appliance 120 may interact with the Server 140. Once completed, the application terminates and then a default screen may be displayed. The default screen may include an initial browser screen.

III. Server Side Operation

Figure 4A:
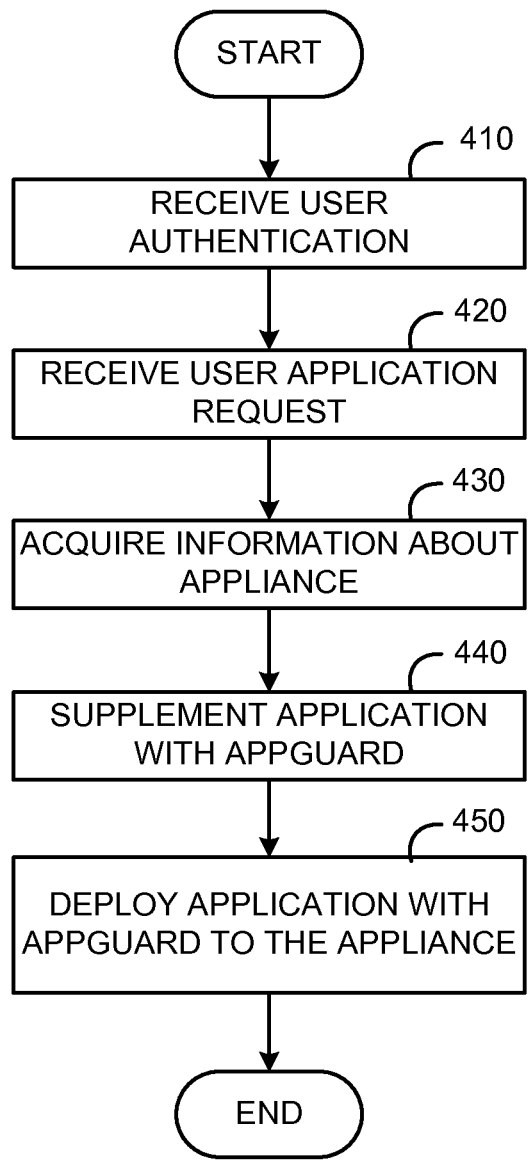
FIG. 4A is an example flowchart for the server side process for deploying an application to the appliance in accordance with an embodiment of the present invention.

The discussion will now be directed to FIG. 4A which illustrates an embodiment of the server side operation of the application management system. This process begins with the receipt of a user authentication, at step 410. As previously noted, user credentials may be stored within one or more databases which the Server 140 may access. Authentication may be performed by a challenge and response or other known authentication scheme. After authentication, the Server 140 may receive an application request from the Appliance 120, at step 420.

An application request may include any of a search request, or a request to download a particular application. When the Server 140 receives a search request, the permissions of the User 110 may be queried such that only applications the user has permission to access are displayed in response to the search. Likewise, applications may only be selected for download if the user has permission to access the particular application.

After a download request is received, the Server 140 may acquire information regarding the Appliance 120, at step 430. This may include accessing information stored about the device on the management Database 160, or may include sending an information request to the Appliance 120 directly. Information regarding the appliance may be utilized in order to ensure the AppGuard supplement is capable of executing on the target Appliance 120, as well as ensuring that the application will function on the Appliance 120.

Figure 4B:
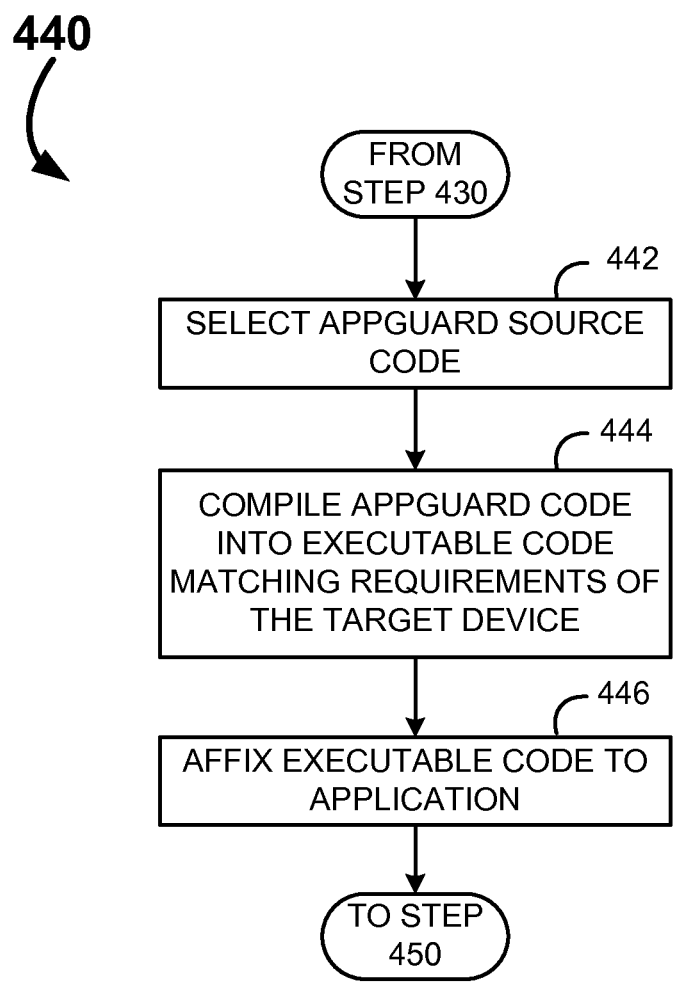
FIG. 4B is an example flowchart for supplementing the application with AppGuard in accordance with an embodiment of the present invention.

At step 440 the application is supplemented with an AppGuard. FIG. 4B illustrates an example of a more detailed flow chart for the supplementing of the application with an AppGuard, as indicated at step 440. In this sub-process, the appropriate AppGuard source code is selected, at step 442. The source code may be compiled into executable code matching the requirements of the target Appliance 120, at step 444. Lastly, the executable code may be affixed to the application at step 446. Returning to FIG. 4A, after supplementing the application, it may be deployed to the Appliance 120, at step 450.

Once the deployed application is downloaded and installed on the Appliance 120, further communication between the Appliance 120 and the Server 140 may occur. For example, changes in the environment of the Appliance 120 may trigger a communication between the Appliance 120 and the Server 140. For example, if the Appliance 120 crosses an international border, and the user doesn't have authority to use particular applications outside of the U.S. border, an exchange between the Appliance 120 and Server 140 may be initiated. In such cases, the relevant applications may be disabled, or even deleted, in order to ensure corporate interests are being properly protected.

IV. Examples

Examples of the application management system and methods will now be provided. Note that these examples are intended to be illustrative, and are not intended to limit the scope of the present disclosure.

In some example embodiment, an existing email reader application for iOS mobile devices may be augmented by the original vendor using an AppGuard supplement. The original vendor's developer must, in some embodiment, download the iOS AppGuard supplement and incorporate the supplement into the existing email reader applications. The developer may then make minor modifications to the original application and rebuild the augmented application using an Apple-issues cryptographic keys to produce a final augmented binary. The application becomes augmented with additional functionalities using an AppGuard supplement; in this example "approve individual application" and "lock device" could be the extended capabilities. A user with the up-loader permission role (Developer) may enter the augmented application binary into one or more Server 140 using a web browser. Upon application execution on the Appliance 120, the code contained by the AppGuard causes the appliance to contact the server and verifies the status of both the example properties. Only the augmented code needs to be stored by the server. A user with an approving role (IT manager) may now label the application as generally executable for any or all devices. A subsequent download by another ordinary User 110 would now result in the augmented version of the application being loaded on that user's Appliance 120 and subsequent access to the capabilities endowed by the application. Apart of the process, an approver might choose to disable this application only for certain users, leaving only a subset of the user community with working access. This might happen at any time, for example to restrict data changes during an audit period or to control account information for management purposes. If a User 110 loses control of the appliance (such as when stolen or misplaced), the user may contact the server using a browser session and may cause the appliance to be disapproved for further use. This may result in the appliance being locked or the appliance being constrained in some way. In some implementations, the application may be simply disabled and may no longer be invoked. In another implementation, local data may be locked or permanently eliminated from the appliance and access to the server may be prohibited.

In an alternate example of some implementation, the appliance may report its environmental status and this data may be used by the appliance or the server to determine if the appliance is still in control of the user. Location sensitive technologies may be used for this purpose. However, for a traveling user the changes in location generally introduce confusion. A better method may be to consider the user's local environment as a key, for example the user's Bluetooth headset or other normally present components may be required to be active before the application can be enabled. In this case, the application wrapper may invoke a function which determines the appliance's supplementary environment and uses this as a key to assure the security of the appliance.

Figure 5A:
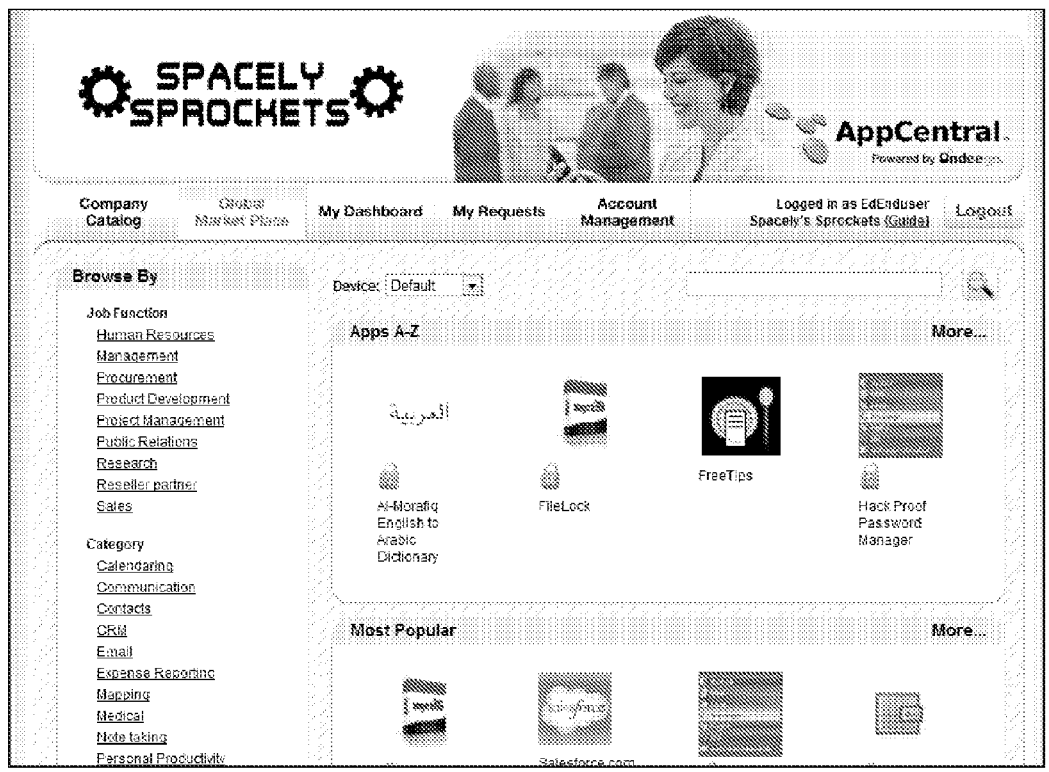
FIGS. 5A-5D are example screenshots for a web based application management interface in accordance with an embodiment of the present invention.

Continuing to an additional example, FIGS. 5A-5D are example screenshots for an embodiment of the web based application management interface in accordance with an embodiment of the present invention. Particularly, FIG. 5A illustrates a typical User's 110 application marketplace. Here a listing of their applications may be seen, along with most popular suggestions and browsing links. Additionally, a search field may be seen for keyword searches for a particular application. The user may logout, select from the company catalog, make requests to IT management or manage the account.

Figure 5B:
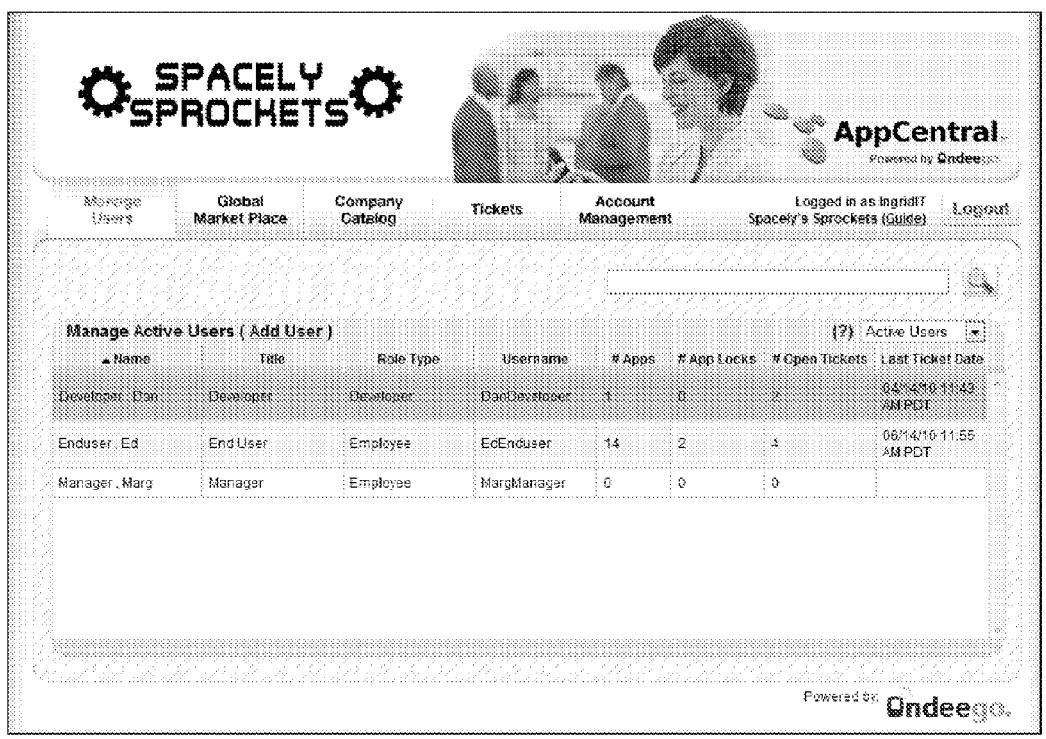
Figure 5C:
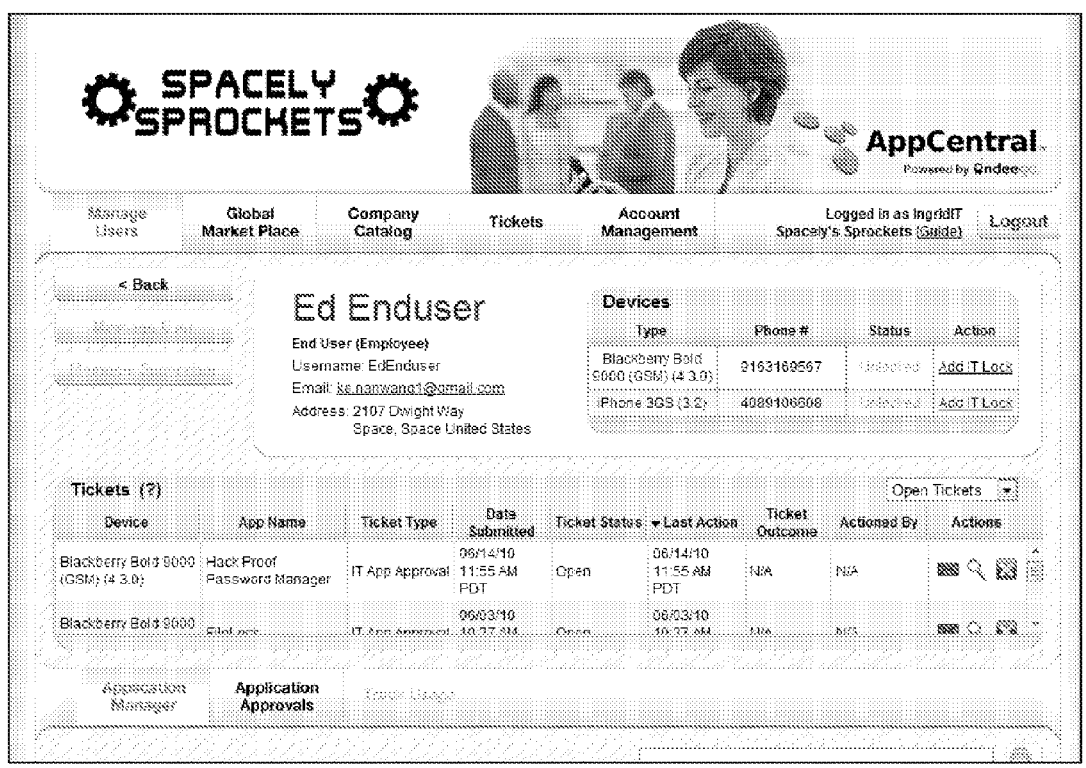

In a similar vein, FIG. 5B illustrates the web based interface for an IT manager interface. Here the IT manager is able to select users and actively manage the permissions for the user. A summary of all user accounts may be seen including the ability to add additional users. Requests from individual users may be reviewed and approved or declined. A user may be selected from the user summary list and be viewed in greater detail as seen at FIG. 5C. Here, usage may be monitored, permissions set and applications may be approved for use.

Figure 5D:

FIG. 5D illustrates an interface where an IT manager is able to review and test applications from the marketplace prior to performing a bulk purchase of the application and placing it within the company store. In this screen, a selected application is presented including a description, device support, pricing and status. The IT manager has the option of testing prior to adding the application to the company catalog, or denying the submission.

Figure 6:
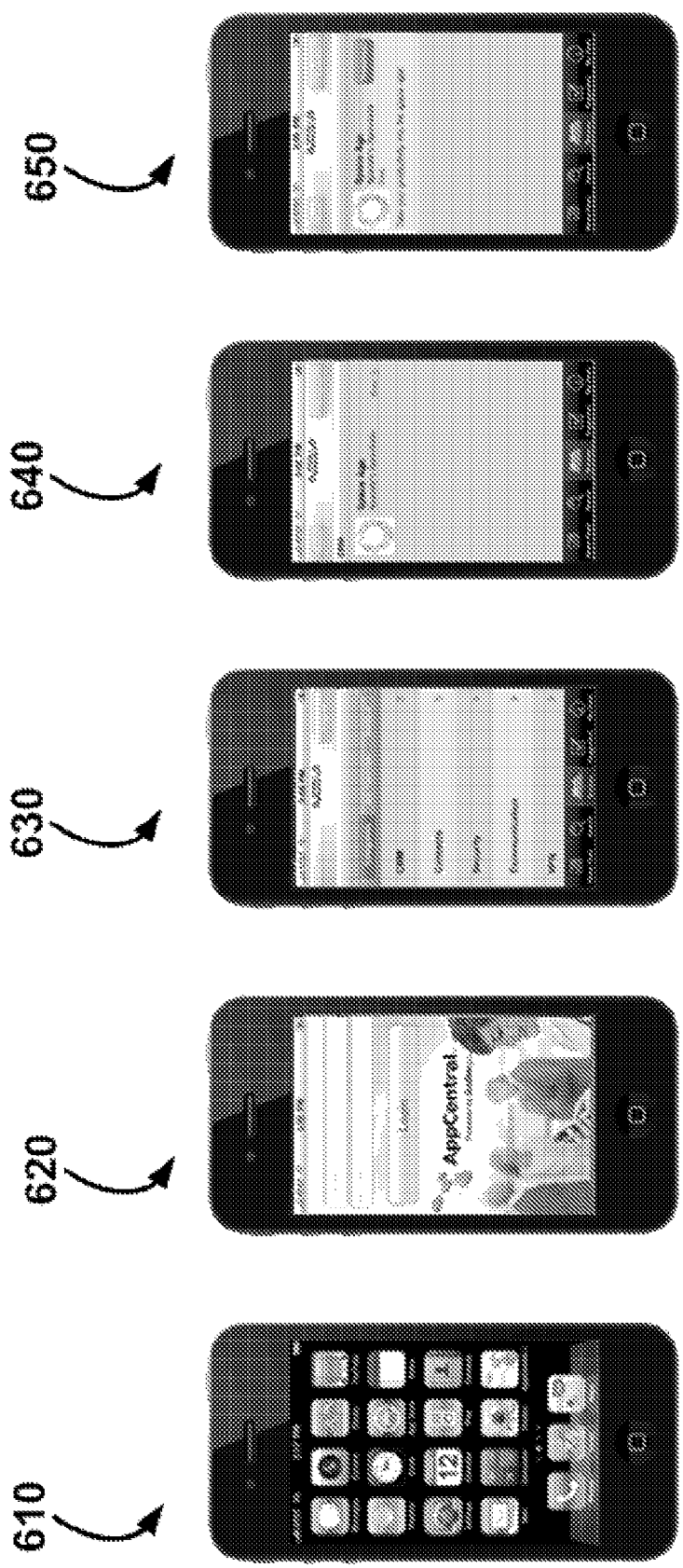
FIG. 6 is an example illustration of the operation of the application management system on a mobile device in accordance with an embodiment of the present invention.

FIG. 6 is an example illustration of the operation of the same browser based interface being accessed on a mobile device in accordance with an embodiment of the present invention. A series of example screenshots are provided, beginning at screenshot 610 with the web application being distributed by email and downloading. A link to execute the program is placed upon the phone home screen. At screenshot 620 the web browser is launched and a logon/authentication screen is displayed. The user must then logon with a password. Screenshot 630 illustrates searching for applications using different browsing modes or by search terms. Screenshot 640 illustrates that an application has been selected and indicates the price the download may cost the particular department within the company. Once satisfied with the selection, the user may select the application and confirm the download, as seen at Screenshot 650. Download and installation then occurs with minimal user input to ensure ease of use.

In sum, systems and methods for managing applications on an appliance are provided. While a number of specific examples have been provided to aid in the explanation of the present invention, it is intended that the given examples expand, rather than limit the scope of the invention. For example, while some embodiments of the invention are illustrated requiring user authentication right after session initiation, it is entirely within the scope of the invention for authentication to be required after download and installation of an application and merely prior to running the application.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A method for managing applications on an appliance, useful in association with a server, the method comprising:
    authenticating an appliance using information relating to the appliance;
    regulating information exchanged between the appliance and a server, wherein the information exchange is supervised by the server, and wherein the appliance is subordinate to the server, wherein regulating information exchanged between the appliance and the server further comprises:
        receiving a request for an application;
        supplementing the application with an application wrapper, wherein the application wrapper is configurable to be executed on the appliance, and wherein the application wrapper is configurable to require validation prior to execution of the application on the appliance; and
        deploying the supplemented application to the appliance; and
    recording transactions of the information exchange between the appliance and the server.

2. The method, as recited in claim 1, wherein regulating information exchanged between the appliance and the server further comprises at least one of authorizing, deleting and disabling the application.

3. The method, as recited in claim 1, wherein more than one application is managed.

4. The method, as recited in claim 1, wherein the regulating information exchanged between the appliance and the server further comprises:
    searching for and selecting the application;
    sending a request for the application;
    downloading the application, wherein the downloaded application includes the application wrapper;
    executing the application wrapper;
    sending appliance data;
    receiving permission; and
    executing the application.

5. The method, as recited in claim 4, wherein the regulating information exchanged between the appliance and the server further comprises at least one of storing, describing, advertising and retrieving the application.

6. The method, as recited in claim 4, wherein searching for the application includes using arbitrary match criteria.

7. The method, as recited in claim 1, wherein the application is managed in response to an environment of the appliance.

8. The method, as recited in claim 7, wherein the application is at least one of monitored and locked in response to an environment of the appliance.

9. The method, as recited in claim 1, further comprising augmenting the application.

10. The method, as recited in claim 1, wherein the appliance is at least one of monitored and locked.

11. The method, as recited in claim 1, wherein the appliance is a mobile device.

12. The method, as recited in claim 4, wherein the application is shared between at least two users.

13. The method, as recited in claim 12, wherein the shared application is modified by at least one of the at least two users.

14. The method, as recited in claim 1, wherein the appliance reports its environmental condition.

15. The method, as recited in claim 14, wherein the environmental condition includes at least one of location, relation to user accessories, user access, date and time.

16. A system for managing applications on an appliance comprising:
    a server configurable to:
        authenticate an appliance using information relating to the appliance;
        regulate information exchanged between the appliance and the server, wherein the information exchange is supervised by the server, and wherein the appliance is subordinate to the server, wherein regulating information exchanged between the appliance and the server further comprises:
            receiving a request for an application;
            supplementing the application with an application wrapper, wherein the application wrapper is configurable to be executed on the appliance, and wherein the application wrapper is configurable to require validation prior to execution of the application on the appliance; and
            deploying the supplemented application to the appliance; and
        record transactions of the information exchange between the appliance and the server.

17. The system, as recited in claim 16, wherein the server is further configurable to perform at least one of authorizing, deleting and disabling the application.

18. The system, as recited in claim 17, wherein the server is further configurable to receive information regarding an environment of the appliance, and further manage the application in response to the environmental information.

* * * * *